Sept. 16, 1924.

G. W. KUEBER

BUNDLE CARRIER

Filed Jan. 3, 1920

Inventor
George W. Kueber,
By
Attorney

Sept. 16, 1924.  G. W. KUEBER  1,509,045
BUNDLE CARRIER
Filed Jan. 3, 1920  2 Sheets-Sheet 2
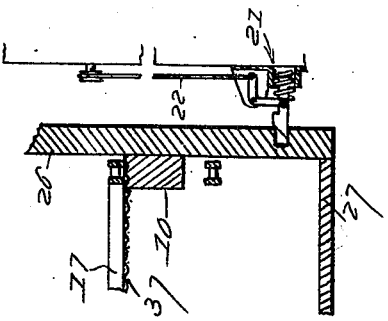
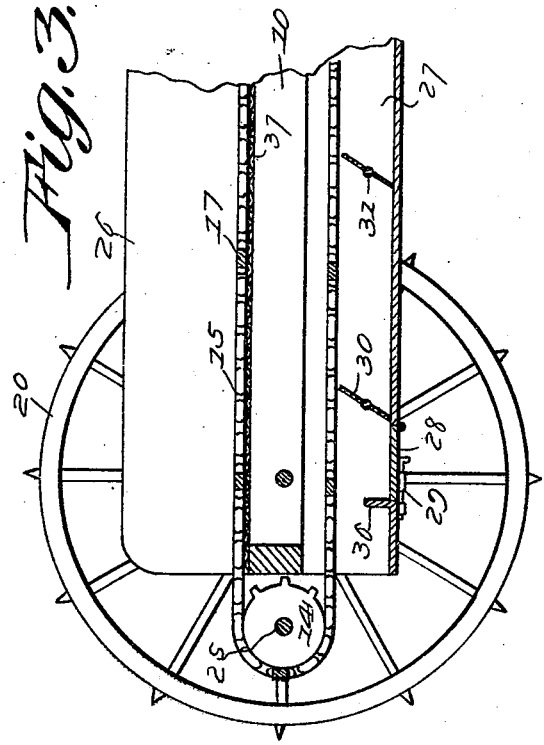
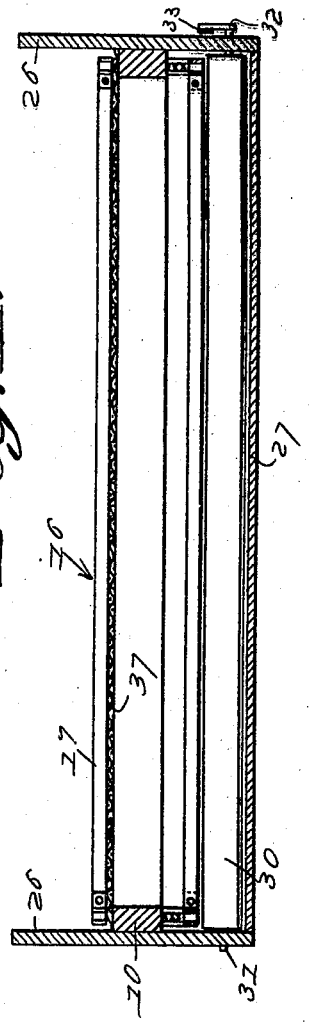
Inventor
George W. Kueber,
By E. Hume Talbert,
Attorney Patented Sept. 16, 1924.

1,509,045

UNITED STATES PATENT OFFICE.

GEORGE W. KUEBER, OF KILLAM, ALBERTA, CANADA.

BUNDLE CARRIER.

Application filed January 3, 1920. Serial No. 349,333.

*To all whom it may concern:*

Be it known that GEORGE W. KUEBER, a citizen of the United States of America, residing at Killam, in the Province of Alberta and Dominion of Canada, has invented new and useful Improvements in Bundle Carriers, of which the following is a specification.

The object of the invention is to provide a bundle carrier adapted for receiving bundles and conveying the same until there has been a sufficient accumulation of the bundles to form a shock and then dumping or discharging them at one place for facilitating the formation of the shock, the carrier being so constructed as to receive and conserve loose grain and grain heads which become detached from the bundles or row not properly caught by the binder to the end that the waste of grain ordinarily incident to the harvesting operation and particularly in the transportation of the bundles from the bundle forming mechanism to the shock may be avoided, and with this object in view the invention consists in a construction and combination of parts of which a preferred embodiment is shown in the accompanying drawing wherein:

Figure 3 is an enlarged longitudinal sectional view on the line 3—3 of Figure 2.

Figure 4 is a transverse sectional view on the line 4—4 of Fig. 2.

Figure 5 is a detail sectional view on the line 5—5 of Fig. 2 to show the means for normally maintaining the carrier in its bundle receiving position.

Figures 1, 2:
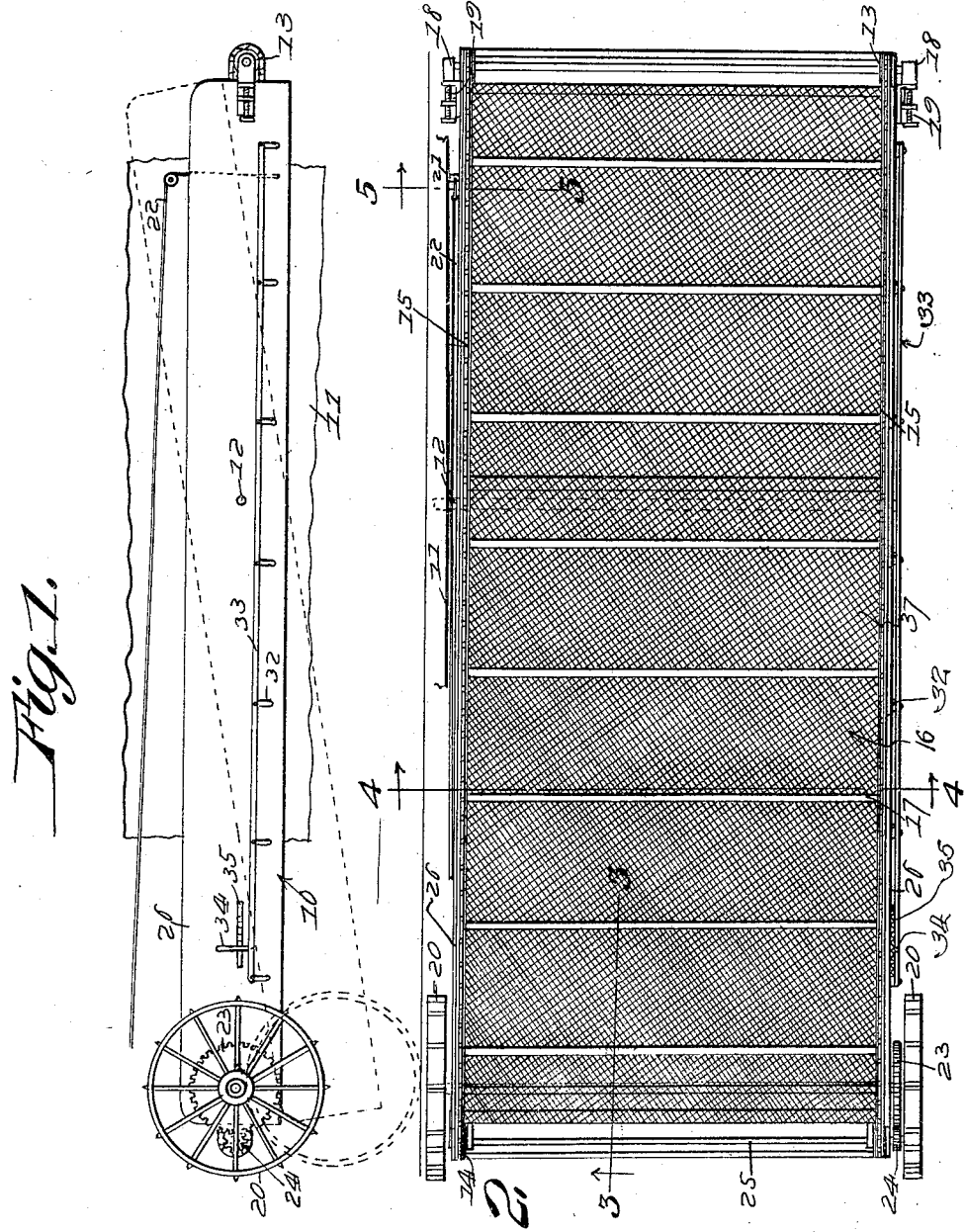
Figure 1 is a side view of the carrier.
Figure 2 is a plan view of the same.

The device consists essentially of a frame 10 which is tiltably mounted as indicated on the member 11 by means of a shaft 12 which is preferably located with reference to the length of the carrier at a point in advance of its center so as to give to the carrier a tendency to incline downward toward its rear end as indicated by the dotted lines in Figure 1, said frame being provided at its front and rear ends with sprocket or chain wheels 13 and 14 traversed by chains 15 forming elements of an apron 16 preferably provided with transverse slats 17. The forward sprocket wheels are preferably mounted in bearings 18 which are adjustable longitudinally of the framework as by means of adjusting screws 19 so as to provide for taking up slack in the apron.

Mounted upon the framework at its rear end are ground wheels 20 adapted when the frame is in its normal position to be held out of contact with the ground so that the bundles may be received by the apron of the carrier until a sufficient number has been accumulated to form a shock, and said frame is held in this normal position by means of a latch mechanism of which a conventional form is indicated at 21 and which may be tripped by the operator through a cord 22 or similar connection when it is desired that the bundles on the carrier shall be discharged. One of said ground wheels is provided with a gear 23 meshing with a pinion 24 on the transverse shaft 25 which carries the rear sprocket wheels 14 to the end that when the carrier frame is released by the tripping of the latch 21 to permit the ground wheels to drop into contact with the surface, the rotation of said wheels communicated through the intermeshing gears will advance the apron and carry the bundles over the elevated end thereof for arrangement in a shock form.

Carried by the frame are the side boards or guards 26 serving to prevent premature displacement of the bundles received by the apron and located below the apron is a grain box 27 adapted to receive the loose grain dropped from the heads in the bundles, said box being provided at the rear end with a discharge opening fitted with a door or closure 28 normally held closed by a latch 29 while arranged at intervals throughout the length of the box are baffles or gates 30 fulcrumed as at 31 and connected by crank arms 32 with an operating rod 33 which in turn is attached to a lever 34 normally engaged with a rack 35 to maintain said baffles or gates in a position to prevent the movement of the grain caught by the box toward the rear or discharge end thereof, so that when the frame is tilted by the disengagement of the latch 21 to permit of the apron moving forward to discharge the bundles, said loose grain in the box will be held by the gates from shifting toward the discharge outlet controlled by the door 28. When, however, there has been a sufficient accumulation of the loose grain in the box 27 to justify the discharge of its contents, the lever 34 may be actuated to move the rod 33 and turn the baffles or gates to a position releasing the grain in the box, so that with the carrier in the inclined position shown in dotted lines in Figure 1 the grain will move toward and through the outlet when the door or closure 28 is opened. An upright guard 36 will serve to prevent the grain from passing beyond the door opening.

As the handling of grain during and subsequent to the bundling operation and particularly during the interval of discharge of the bundles from the binder table and the arrangement of the bundles in shocks results in the detachment of a relatively large proportion of grain which ordinarily is dropped upon the ground and lost or wasted, a means such as above described for catching the same will result in the course of a day's harvesting in effecting a considerable economy and the only additional work devolving upon the operator in connection therewith is the tilting of the carrier at suitable intervals to cause the discharge of the accumulated loose grain into a suitable receptacle by which it may be conveyed to the bin or storage house to be combined with the grain which is subsequently separated in the ordinary way by the threshing operation.

Preferably the apron of the conveyor consists essentially of the transverse slats 17 connecting the chains 15 and arranged to traverse the surface of a screen 37 which is secured to the frame 10, so that the movement of the apron with reference to the screen serves as a means of directing the grain through the screen for reception by the grain box located below the plane thereof.

What is claimed is:

1. A bundle carrier having a frame, an endless conveyor mounted upon the frame, a grain box arranged beneath the conveyor and provided at one end with a closure, and movable baffles arranged at intervals through the length of said grain box for normally preventing the shifting of grain received thereby.

2. A bundle carrier having a frame, a conveyor disposed for movement longitudinally of said frame, a grain box arranged beneath the conveyor and provided at one end with a closure controlling an outlet, tiltable baffles arranged at intervals throughout the length of the grain box to normally prevent the longitudinal shifting of the grain therein, a lever operatively connected with said baffles for moving the latter to grain releasing positions, and means for normally holding said lever with the baffles in their operative positions.

In testimony whereof he affixes his signature.

GEORGE W. KUEBER.